United States Patent [19]
Wahlberg

[11] 3,826,344
[45] July 30, 1974

[54] APPARATUS FOR TRANSACTING BUSINESS

[76] Inventor: Eric C. Wahlberg, 32 Eighth St., Stamford, Conn. 06905

[22] Filed: Aug. 9, 1971

[21] Appl. No.: 170,279

Related U.S. Application Data

[63] Continuation of Ser. No. 816,565, April 16, 1969, abandoned.

[52] U.S. Cl................ 194/2, 194/DIG. 9, 221/2, 340/149 A
[51] Int. Cl. ............................................ G07f 7/00
[58] Field of Search .......... 186/1; 194/4, DIG. 9, 2; 221/2; 222/2; 340/149 A

[56] References Cited
UNITED STATES PATENTS

| | | | |
|---|---|---|---|
| 2,912,066 | 11/1959 | Ellithorpe | 186/1 C |
| 3,038,157 | 6/1952 | Simjian | 194/4 X |
| 3,254,749 | 6/1966 | Scherer | 222/2 X |
| 3,397,763 | 8/1968 | Wahlberg | 194/4 |
| 3,446,328 | 5/1969 | Boyce | 194/4 |
| 3,448,843 | 6/1969 | Mesh | 222/2 |
| 3,588,449 | 6/1971 | Paterson | 340/149 A X |

Primary Examiner—Robert B. Reeves
Assistant Examiner—Thomas E. Kocovsky
Attorney, Agent, or Firm—Fisher, Christen & Sabol

[57] ABSTRACT

Apparatus for transacting business by the use of a standard currency, credit cards, checks, bank drafts, deposit vouchers, large denomination paper currency or foreign currency including means for registering a credit against an account or the cost of items to be purchased and means for remotely controlling a plurality of such apparatuses.

26 Claims, 20 Drawing Figures

INVENTOR.

INVENTOR.
Eric C. Wahlberg

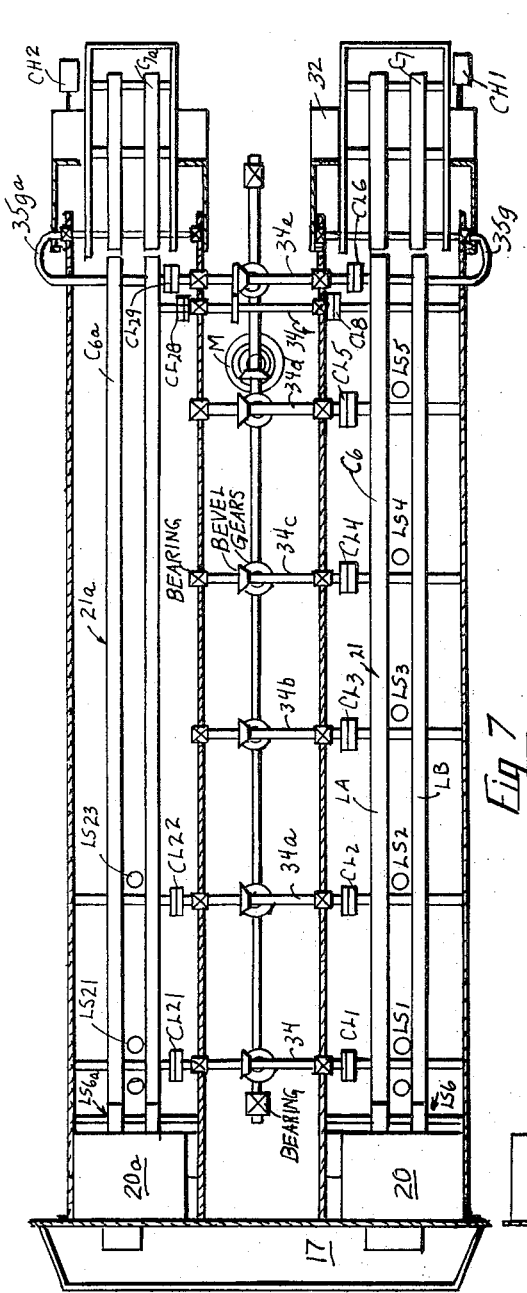
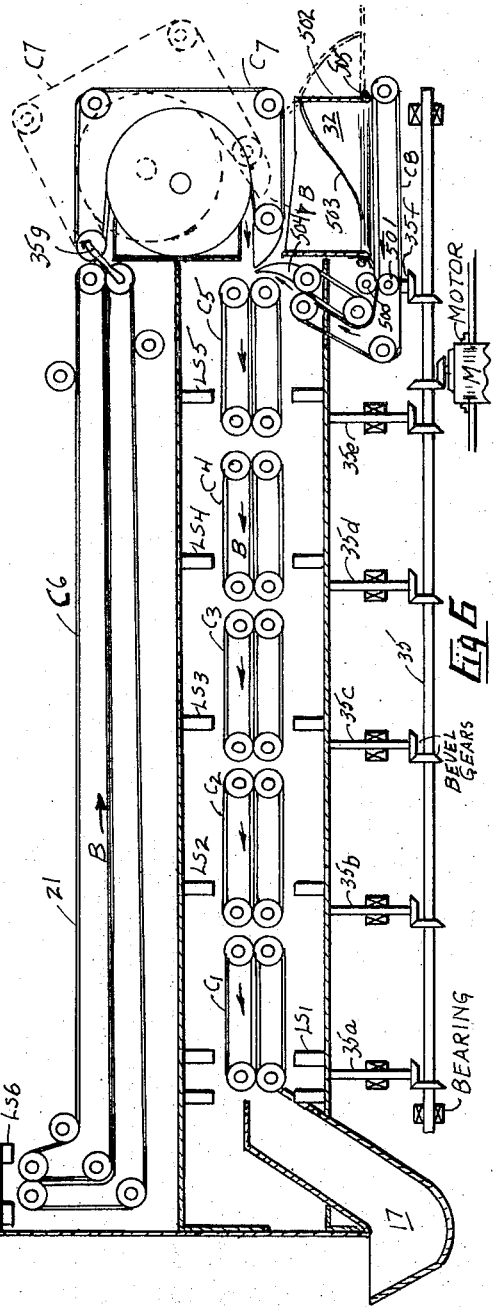
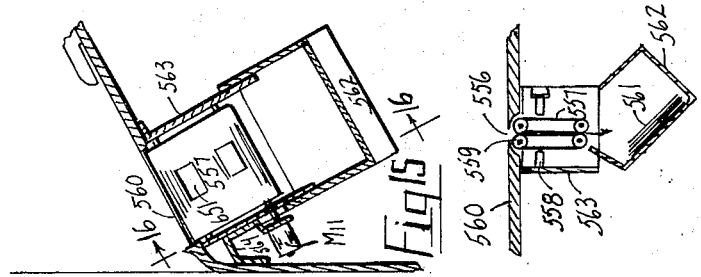

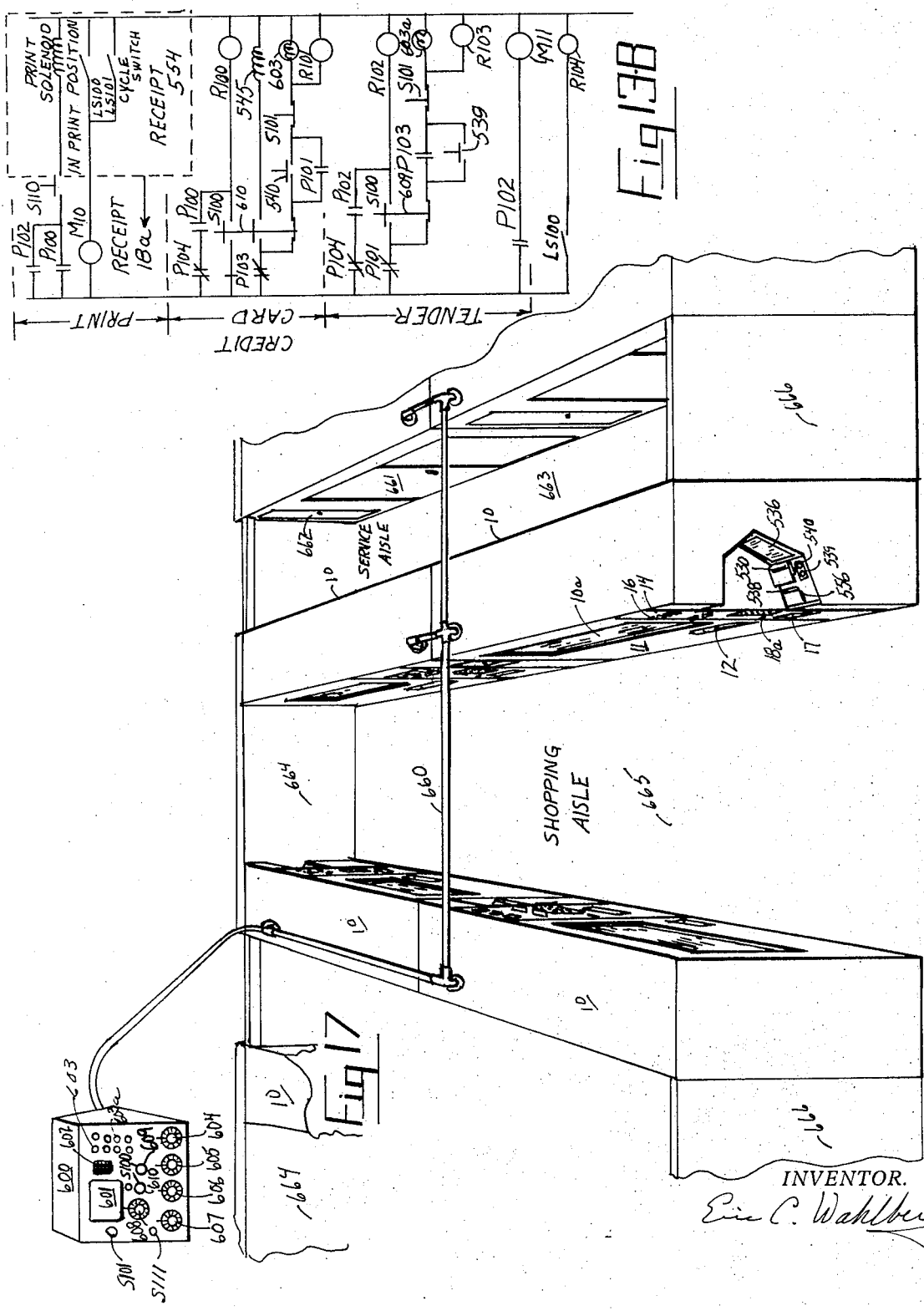

APPARATUS FOR TRANSACTING BUSINESS

This is a continuation of application Ser. No. 816,565, filing date Apr. 16, 1969 now abandoned.

This invention relates to apparatus for automatically handling the many manual operations now performed in the transaction of business involving the sale of merchandise or services and the handling of legal tender, credit cards, checks, and other credit representations and negotiable instruments included in the banking community transactions. The particular embodiment shown and described illustrates one form of the invention which might be used in a retail establishment in which items or services are chosen and issued when authorized by presentation of legal tender, negotiable instruments or credit representation in the amount of the total costs of the items or services. Two means of presenting and receiving payment are afforded. The first requires insertion of payment into the validating and value establishing mechanisms. The second method requires presentation of the payment media to the scrutiny of validating the value establishing personnel.

The transaction may be monitored remotely for security or customer convenience. Apparatus of the type described herein may be installed in each of several widely separated locations and monitored from a remote location in such instances as may be required in the Post Office system where substations and unattended facilities are required to augment the facilities of the main Post Office lobby. Or , several of the vending machines may be located in proximity to each other and remotely monitored in such instances as may be required in a supermarket where the quantity of items handled make the handling of these items by one machine impractical. Further, this apparatus may be used where the value of transactions are large and require security precautions as may be required in such applications as bank transactions.

In the present world of business transactions, there are a number of media by which payments are made. There is the cash or currency media, the credit card media, the check media, foreign currency media, the money order media and others. In some of these media an identification of the holder is required for conversion or acceptance. There is always the possibility of stolen or counterfeit media.

It is therefore the object of this invention to provide an apparatus for transaction of business which will provide for acceptance of all such negotiable instruments and credit representations with utmost security against fraudulent usage.

Another object of this invention is to provide a remote controlled multiple transaction system whereby several multiple transaction vending machines of the type described hereinafter may be remotely controlled.

This invention further pertains to electrical circuitry, mechanisms and means for operating various kinds of change, receipt and dispensing devices, and other devices and means for receiving authorization for issue of articles and services including accpetance of coins and bills, credit cards, legal tenders of the type usually designated as checks, money orders, large bills, foreign currency, and circuitry for determining the value of each, and in particular a machine which will give a customer the choice of the mode of payment - ie by check, cash, credit card or large bills and foreign money or other tender.

This invention further pertains to the recognition of the value limit and validity of credit representations and negotiable instruments, and to the identify of the offerer. One form of credit representation is the popular credit card. On this card is placed the name and credit number of the bearer either by embossing, punching, magnetically treating or combining all of some of these methods to provide identification to the merchant. The embossed card is in general use and, in general, serves as a print plate for recording card information for billing purposes and acknowledgment of receipt of goods or services.

In contrast, the punched or treated cards may be coded to limit the credit to be issued and may be automatically examined by appropriate checking devices (magnetic or photo-electric readers) and the signals generated by the checking device processed according to a predetermined schedule. Thus, treated credit representations may be used as a means for inserting information into business transactions machines when inserted into the checking device. when the signals from the checking device are fed into the computor as described hereinafter, they may be used to satisfy the costs generated in the purchase of items sold in a vending machine or in the processing of a package for shipment according to the physical characteristics and destination of the package.

Many attempts have been made to provide a means whereby the validity of the credit representation and the identity of the holder is assured. Such devices have not been completely successfull in protecting the holder. While all these devices certainly would be applicable and incorporable into the invention and provide embodiments of the instant invention, the embodiment described herein is thought to provide as much protection as the circumstances require and a maximum of protection to the credit holder.

It is, therefore, an object of this invention to provide an apparatus which will assure proper identification of the customer and varification of the validity of proffered means for satisfaction of incurred expenditures.

All present currency operated machines are limited in the amount of type of legal tender which can be used or accepted by them in transactions involving their items or services.

An object of the present invention is to provide a flexible means for using and accepting any amount accorded to any kind of legal tender, negotiable instruments and credit representations and determining the value associated with them for the purpose of trade and financial satisfaction of services rendered and articles purchased.

Another object of the present invention is to include means wherebt a person may not only deposit tender for payment of costs of articles purchased and receive change but may deposit for savings as in a bank or withdraw as from a checking account or for cashing checks, etc.

Another object of th present invention is to provide means for accepting foreign legal tender at the accepted rate of exchange.

Another object of the invention is to provide facilities for determining the validity of the tenders , negotiable instruments and credit representations offered and the identification of the offerer.

Another object of the present invention is to provide surveillance and greatest security of all procedures and transactions.

Another object of this invention is to provide an apparatus which will operate in any country without undue alterations due to the currency requirements.

Still another object of the present invention is to provide means for issuing change in coins and bills, issuing receipts and records of transactions such as credit card purchases.

Other objects and advantages of this invention will be apparent to those skilled in the art after reading the following specification in connection with the annexed drawings, in which;

FIG. 2 is a sectional elevation view of FIG. 1 showing the coin and paper currency mechanism therein;

FIG. 6 is an enlarged sectional view of the paper currency detecting and conveying mechanisms of FIG. 1;

FIG. 7 is a plan view of FIG. 6;

Figure 14:
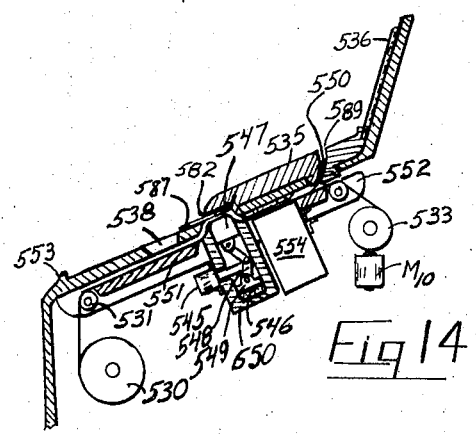

FIGS. 11, 12, 13, 13A, and 13B are circuit diagrams for actuating the calculating, money handling, legal tender, negotiable instrument and credit representation recognizing mechanisms of this invention;

FIG. 14 is a cross sectional view of the credit representation recognizing and handling mechanism;

FIG. 15 is a cross sectional view of the negotiable instrument and large value legal tender handling mechanism employed in this invention;

FIG. 16 is a view of a negotiable instrument handling mechanism taken along lines 16—16 of FIG. 15;

FIG. 17 is a view of an installation of the invention including a remote monitoring and control center as used in conjunction with credit representation, negotiable instrument and large domestic and foreign legal tender handling, and surveillance handling procedures.

Figure 1:
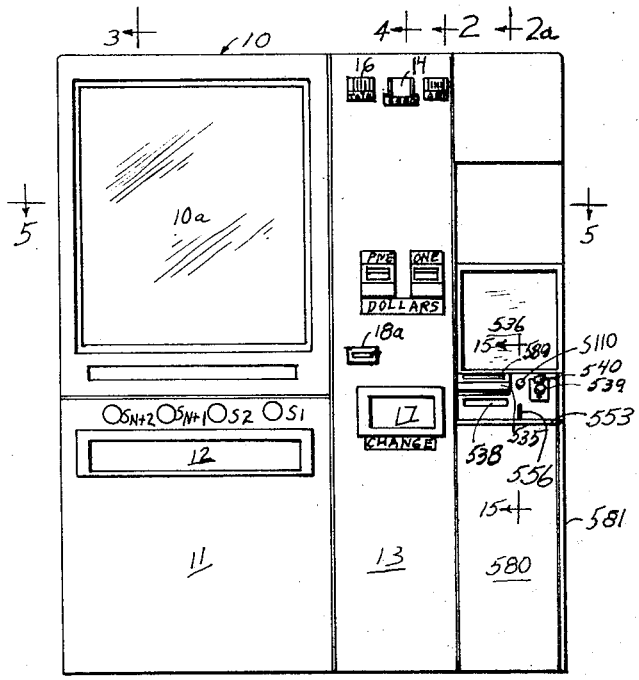
FIG. 1 is a front elevational view of a preferred form of the invention.

In general, the embodiment of the invention as shown in FIG. 1 and described below is for installation in an office building, hotel, market place or the like where articles are selected and paid for by the customer and dispensed to same as a member of the general public.

Further, the embodiment of the invention as shown in FIG. 17 and also described below is for installation in a place where a relatively large number of articles are sold and where the articles may be of relatively large number of categories such as is the case in grocery stores, drug stores and supermarkets.

Further, the embodiment of the invention as shown in FIG. 17 is for installation in a bank or the likes where a number of money handling stations are required and where vulnerability to holdups is present, to remove the currency and negotiable instruments from the stations to a remote depository for dispensing to the stations only on call from the stations and in the amount required. Each of the stations requirements can be monitored and controlled remotely.

Referring to FIG. 1, the vending machine 10 of the apparatus for transacting business comprises, in general, a hinged transparent door section 10a or the like provided for display of articles offered for sale and a stationary support section 11 below it. An item compartment 12 with opening 12a provides means for gathering the items purchased as evidenced by position of the article selector actuators S1, S2, etc., a cabinet section 13 providing for controls and receipt of currency and issuance of change. An additional section of the apparatus provides for the use of a credit representation, negotiable instruments and legal tender in payment for the merchandise. The front section 13 comprises coin receptacle means 14 for receiving coins and paper currency receptacle means 15 for receiving bills, indicator 16 which shows the total cost of the purchase, a change receptacle 17 and an opening 17a for returning change. A receipt means 18 having an opening 18a is also provided for receipts of purchase. The front of section 580 comprises a recess with a sloping counter beginning at the front edge and extending upwardly towards the rear to meet with another area which slopes more steeply upward and to the rear. The first sloping area is used for a writing surface and has a slot 538, a negotiable instrument and legal tender receiving slot 556, a receipt dispensing slot 589, a credit representation locator 535, credit representation switch 540, a legal tender and negotiable instrument switch 539 located on it. The second slope supports a reflector 536 used in conjunction with a closed circuit television camera located in the cabinet and focused on the reflector 536 and the first slope. Section 580 is hinged to provide access to the controls and legal tender hoppers in section 13. The side of the section 580 of the cabinet has a hinged door 581 to provide access to the negotiable instrument and legal tender hoppers and the receipt issuing mechanisms. An attractive article description (not shown) may be located at the lower edge of display door 10a or other suitable place. The items are selected by operating switch plungers S1, S2, Sn + 1, etc., each of which may be operated by being pushed, pulled or operated, depending on the desired mode of operation. The above selector means actuate circuits as hereinafter explained in connection with FIGS. 11 through 13B.

Figure 2A:
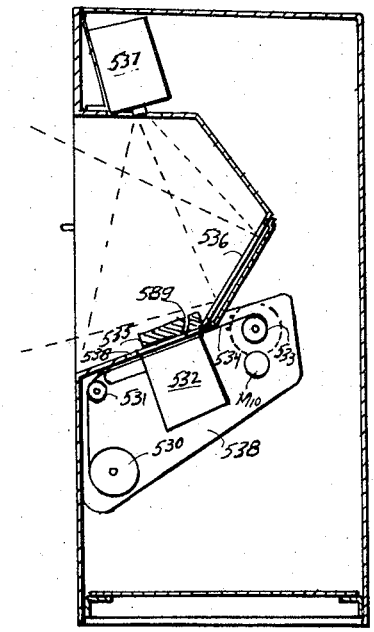
FIG. 2A is a sectional side elevation view of FIG. 1 showing credit representation means therein.

Referring to FIG. 2, the paper currency validator 20 and conveyor 21 are connected to the bill hopper 32 and change and receipt compartment 17 of cabinet 13 by means of paper currency conveyors driven by drive shaft 35.

Figure 3:
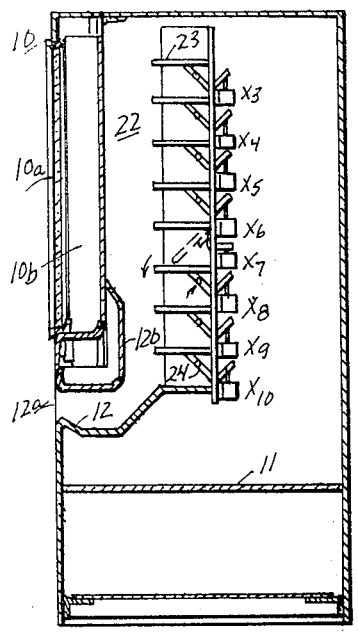
FIG. 3 is a side sectional view taken through the article shelf compartment of FIG. 1.

In FIG. 3 the enclosed display area 10b is positioned above purchased item opening 12 above stationary support 11 of vending machine 10. The storage area 22 consisting partially of collapsible shelves 23 is located above opening 12a of chute 12b for dispensing purchased items as shelves 23 are selectively released. The shelves 23 are controlled by linkages 24 and solenoids X3–X10 are actuated by the circuits of FIGS. 11, 12, 13 and 13A. Opening of display area door 10a provides access to storage area 22 for loading and resetting shelves 24. The door 10a may have a lock thereon, as desired, to prevent unauthorized opening of the door.

Figure 4:
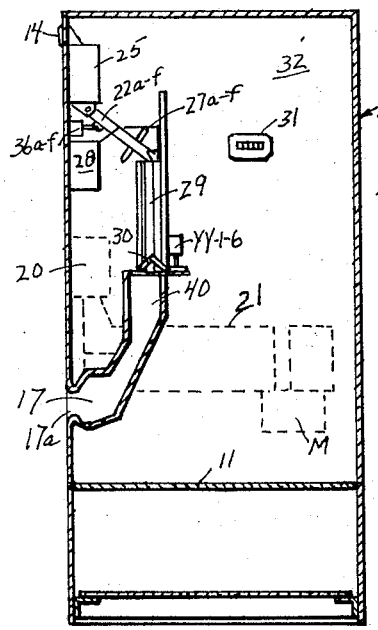
FIG. 4 is a sectional elevation view taken through the coin handling mechanism along line 4—4 of FIG. 1.

Referring to FIG. 4, a side sectional view of cabinet 13 containing therein coin validator and acceptor 25, coin chute 26, with deflector 22a-f and coin storage hopper 28 is shown. Coin changer tubes 29a-f are located above coin guide 40. The coin changer 29 is actuated through solenoids YY1-YY6, which actuate linkages 30. The coin chute 40 controls the flow of coins into the change opening 17. A total sales indicator 31 is shown mounted on the side partition 32 of FIG. 5 and is interconnected by linkages or circuitry (not shown for clarity) to the articles dispensing compartment 22. Shown in broken lines is an outline of the location of the paper currency change mechanism.

Figure 5:
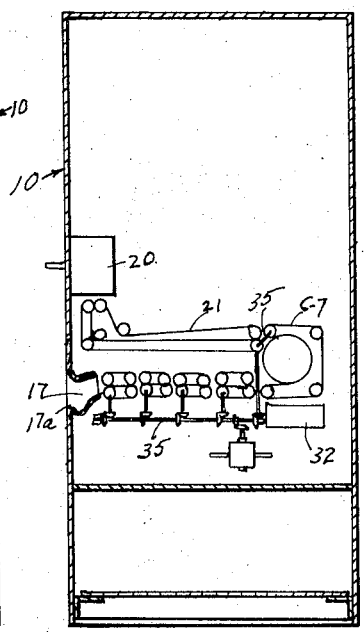
FIG. 5 is a sectional plan view of FIG. 1 taken along lines 5—5.

In FIG. 5, the relative positions of the goods compartment 22, partition 32, coin tubes 29a-29f for halves, quarters, dimes, nickels and pennies respectively, paper currency validators 20, 20a, and article support shelves are shown with respect to the glass or transparent plastic door 10a. Shelves 23 are actuated or tripped by solenoids X1-X10, Y1-Y10, Z1-Z10, XX1-XX10 acting through their respective linkage means 24 to dispense items chosen therefrom after currency is placed in either the paper currency validators 20, 20a or coin tubes 29. Currency validators 20 and 20a uniquely cooperate with conveyors 21 and 21a in dispensing change in the form of paper currency to the customer in receptable 17 after a purchase.

The driving means for the novel conveyor paper currency changers of FIG. 6 and 7 comprises a system of conveyors selectively controlled by photo-cell limit switches or the like and magnetic clutch means, all driven by a gear means and common motor M for each bill validator 20 and 20a in response to currency inserted therein by a customer in payment for the purchase of articles from the vending machine.

Referring to FIGS. 6 and 7, one of the unique paper currency change conveyors is comprised, in general, of conveyors C1, C2, C3, C4, C5, C6, C7 and C8 which cooperate with paper currency validator 20 and change receptacle 17 and currency hopper 32 in response to limit switches LS1, LS2, LS3, Ls4, LS5 and LS6, photoelectric or other similar means, which operates in response to paper currency from validator 20 passing through the above conveyors in series. Conveyor C7 is shown pivoted about roller axis 33. The paper currency is first passed from paper currency validator 20 through conveyor C6 which in turn passes the paper currency through conveyors C7, C5, C4, C3, C1 as indicated by arrow B and then into receptacle 17. Should the conveyors C1, C2, C3, C4 and C5 become filled with paper currency, then conveyor C7 will hinge upwardly by actuation of solenoid CH1, due to the reaction of limit switches LS5 and LS6, as indicated in broken lines to allow other paper currency to be deposited in paper currency hopper 32. Rotary shaft 33 of conveyor C7 is rotated by flexible shaft 35g being rotatably secured to shaft 34e rotated by drive shaft 35e and clutch CL6 driving parallel spaced belts LA and LB of conveyor C6 as shown. Magnetic clutch means CL1, CL2, CL3, CL4, CL5 and CL6 are selectively controlled by limit switches LS1, LS2, LS3, LS4, LS5 and LS6 respectively, as hereinafter described in connection with operation of the circuits of FIGS. 11, 12, 13, and 13A. The limit switches LS1, LS2, LS3, LS4 and LS5 are positioned between two lower spaced pairs of belts LA and LB and two upper spaced pairs of belts LC and LD to register paper currency passing between the operating lower spaced pair of belts and the coacting upper pair of spaced belts, as best shown in FIGS. 6 and 7. Likewise, limit switch LS6 is operative between a pair of spaced lower belts and a coacting pair of spaced upper belts.

Clutches CL1, CL2, CL3, CL4, CL5 and CL6 for the dollar change maker 20 are driven by shafts 34, 34a, 34b, 34c, 34d and 34e geared by bevel gears to vertical shafts 35a, 35b, 35c, 35d, 35e and 35f which are in turn driven through gear means or drive shaft 35 operatively connected to motor M as shown. Similarly, clutches CL21, CL22 and CL29 for the five dollar change maker 20a are driven by drive shafts 34, 34a and 34e. The main drive shaft 35 serves conveyor 21a through vertical shafts 35a, 35b, and 35f and appropriate bevel gears as shown. In other words, the conveyor system of 5 dollar bill changer 20a is a duplicate portion of the one shown for dollar bill changer 20, as described above. The bill changers 20 and 20a each cooperate through their respective conveyors with currency receptacle 17.

There is also shown in FIG. 6 a means for replenishing the supply of bills in CL1 - CL5 should there not be a smooth flow from bills inserted into bill validator 20. Bill receptacle 32 is fitted with a hinged rear wall to which is attached a spring retainer and weight. The rear wall 502 is pivoted backwardly about hinge 505 when conveyor C7 is pivoted about shaft 35g to allow bills to fall into hopper 32 and under spring weight 503 when conveyors C1-C5 are filled with bills. Conveyor C8 is located directly beneath hopper 32 and becomes the bottom for hopper and cooperating with C8 is a roller which is slip clutch connected to the power source to turn in a direction opposing that of conveyor C8. Conveyor C8 connects with and feeds bills to conveyor C5 by means of guide 504. When there is no bill in conveyor C5, conveyor C8 will start through clutch CL8, shaft 34f, shaft 35f and motor M to take the bottom bill from hopper 32 and feed it to conveyor C5. If more than one bill comes out of the bottom of the hopper at one time, roller 500 will cause the upper bill to be held back until the bottom bill has cleared the roller 500. The clutch controlling the motion of the roller is adjusted to provide power to move the roller backwards when there are two bills together but to provide only retarding drag on conveyor C8 when only one thickness of bill is present between the roller 500 and conveyor C8.

Figure 9:
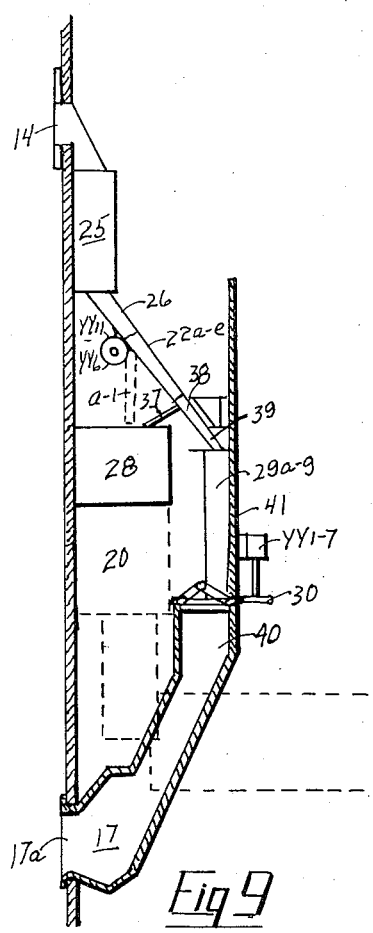
FIG. 9 is a sectional view of FIG. 8 taken along lines 9—9 as indicated.
Figure 8:
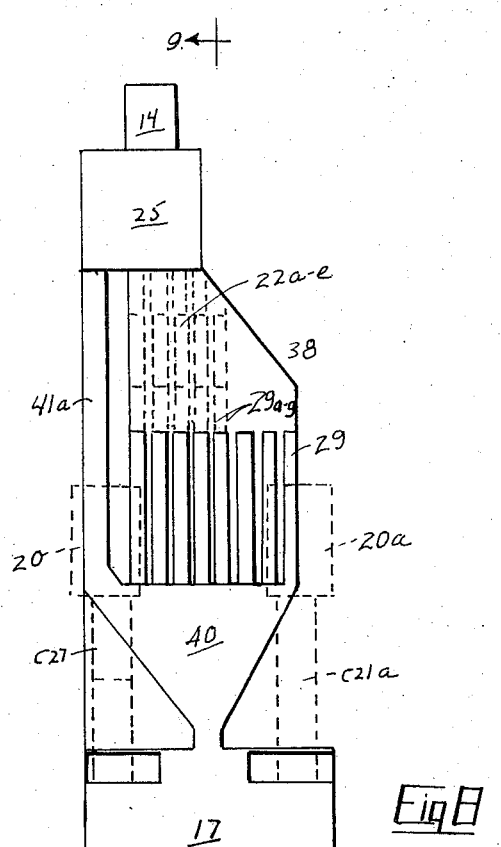
FIG. 8 is an enlarged rear view of the coin receiving and dispensing mechanism of FIG. 4.
Figure 5:
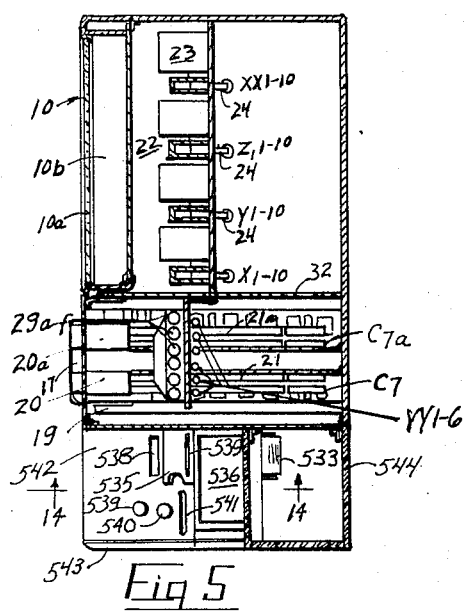

Referring to FIGS. 8 and 9, coin accepter 25 feeds coin chute 26. The deflector 22 is hinged to chute 26 solenoids YY1-YY6 operating hinge 36. A coin guide 37 and stop 38 is provided to insure placement of coins in receptacle 28 or in chute 39. Chute 39 feeds coins into tubes 29a-29f. The bottom of the coin tubes are located so as to allow coins therein to flow into receptacle 17. Coin tube operation is accomplished by selective circuit operation of solenoids YY1-YY6 t actuate linkages 30. The solenoids and coin are mounted to plate 41. The coin tube 41a returns slugs and reject coins through hopper 40 and change dispenser 17 to the customer, as best shown in FIG. 8.

For sake of clarity, the wiring to the various electrical connectors in FIG. 1–9 and 14–17 are not shown.

Figure 10:
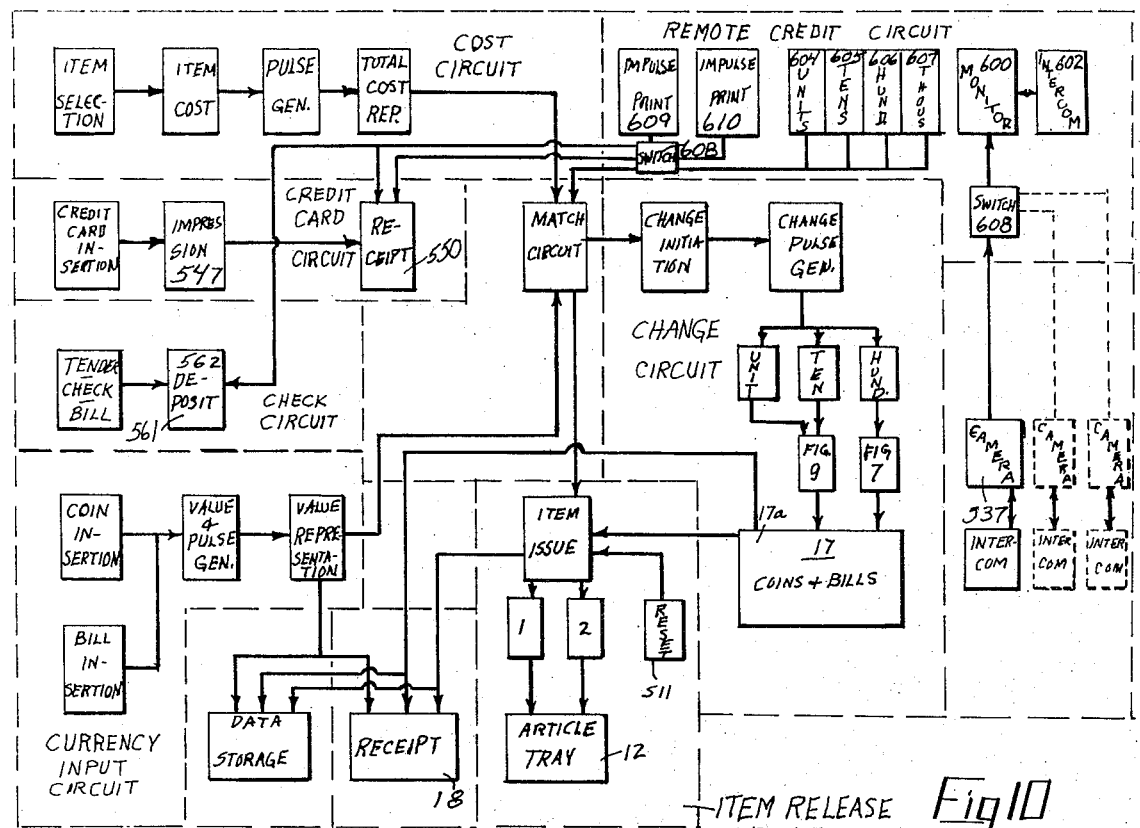
FIG. 10 is a functional block diagram of some of the various and interrelated functions performed by the invention.

Referring to FIG. 10, the interrelated functions of the mechanism of FIGS. 1–9 and 14–17 as coordinated with the circuit functions of FIGS. 11 12, 13 and 13A are illustrated in functional block diagram form. The circuitry for operating the instant machine 10 comprises, in general, a cost circuit and a coin and currency circuit each of which has an output which feeds into a matching circuit which has an output which feeds into an item issue circuit and an output which feeds into a change initiator which output actuates a pulse generator to make change in coins as shown in FIG. 9 and to make change in bills as shown in FIG. 7. The total change is deposited in change tray 17 which has a photoelectric means for detecting and recording the same on the receipt circuit. The item issue circuit comprises, in general, circuits, reset means S11 or similar like means, and an article receiving tray 12. The inputs to the receipt circuit are also interconnected to the data storage circuit as shown.

In addition, there is included in the functional block diagram of FIG. 10 credit representation noted as credit card circuit having an output to the receipt circuit through a remote control station. There is also a negotiable instrument means represented by the check circuit which has an input from the remote control station for accepting and depositing of the negotiable instrument, together with an input to the receipt circuit. The remote circuit has outputs for insertion of values of the negotiable instrument which are fed to the match circuit and print impulse circuits for both the credit representation and the negotiable instruments circuits. The remote station incorporates a switching circuit for operating more than one machine. Also illustrated are the monitor and intercom together with the switching circuit to monitor through closed circuit television the handling of the credit representation procedures through cameras located in a position to observe the customer and the credentials for honoring the credit representation or negotiable instruments and for general instructions for operating the subject machine.

Referring to FIGS. 10, 11, 12, 13A and 13B, the cost circuit of FIG. 10 is comprised of an item selection circuit, an item circuit, a pulse generator circuit and total cost representing circuit.

Figure 11:
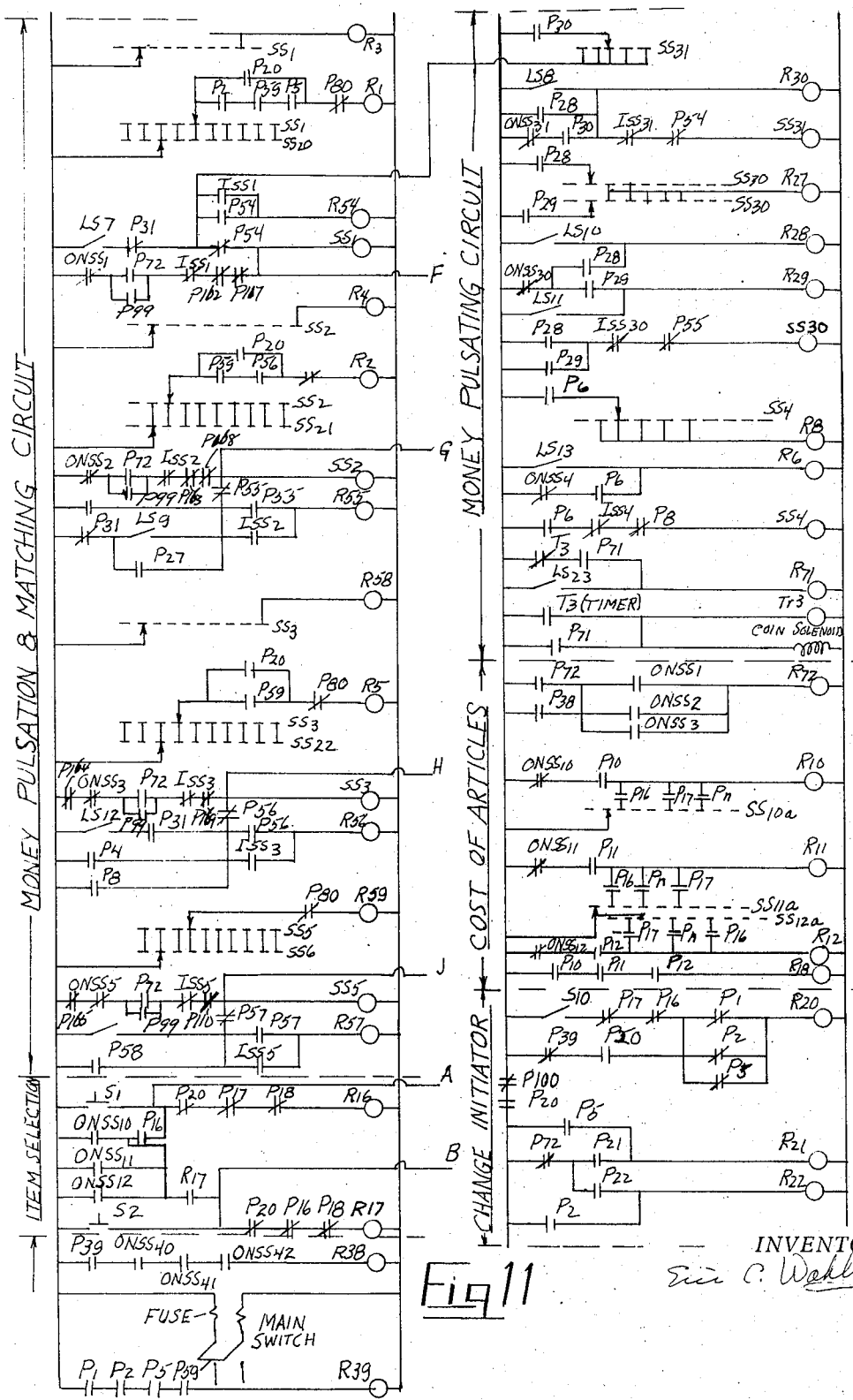

The item selection circuit of FIG. 10 is comprised of circuitry as shown in FIG. 11.

The item cost representation circuit of FIG. 10 also consists of other circuitry as shown in FIG. 11.

Figure 12:
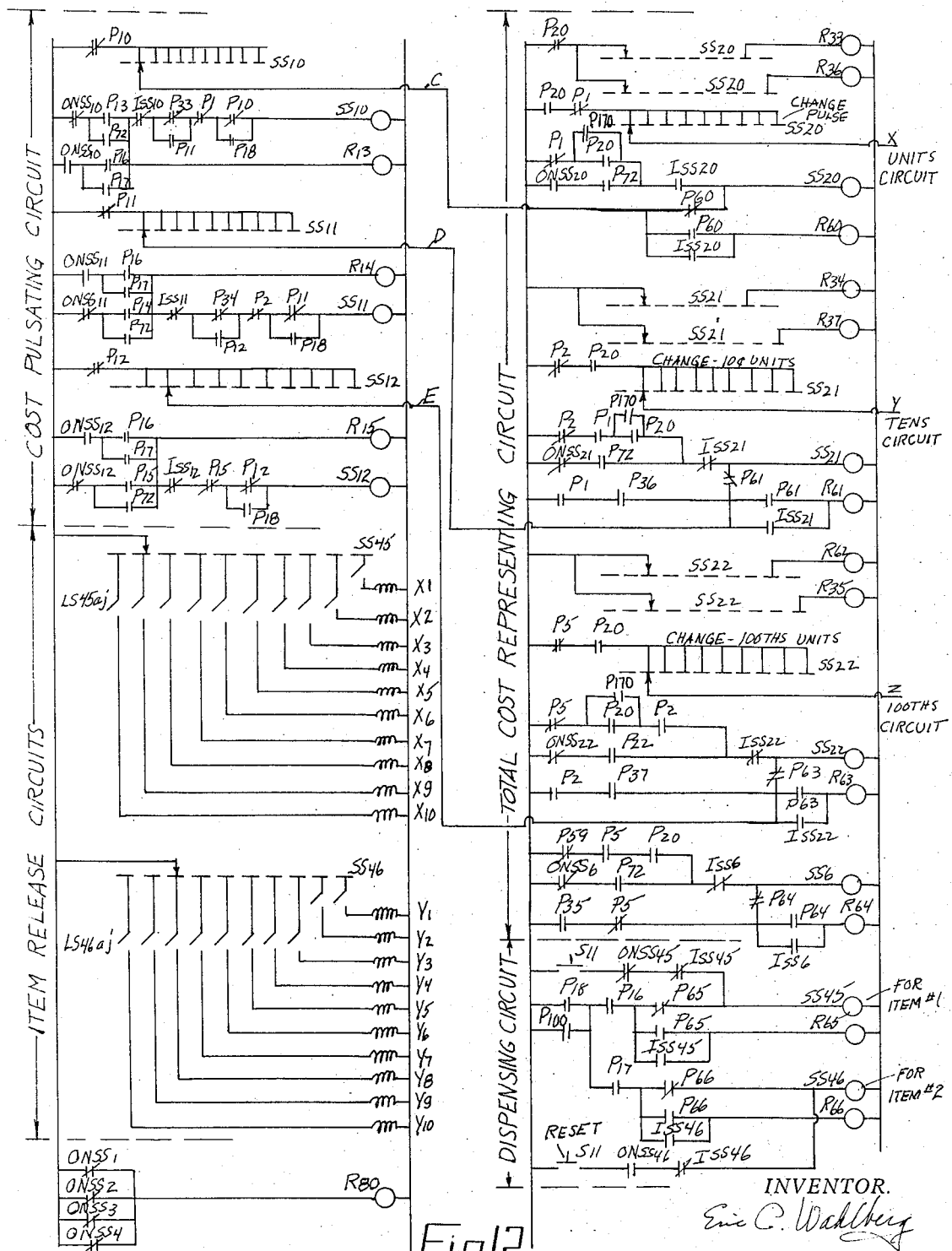

The pulse generator circuit of FIG. 10 is comprised of circuitry shown as cost pulsating circuit in FIG. 12.

The total cost representation circuit of FIG. 10 is comprised of circuitry shown as total representation circuit of FIG. 12.

The currency input circuit of FIG. 10 comprises coin insertion circuitry, paper currency insertion circuitry, the output of each circuit connected as an input to a currency value circuit, and a pulse generating circuit. One of the outputs of these two circuits is connected as an input to a matching circuit and the other output is connected to the receipt circuit.

Figure 13A:
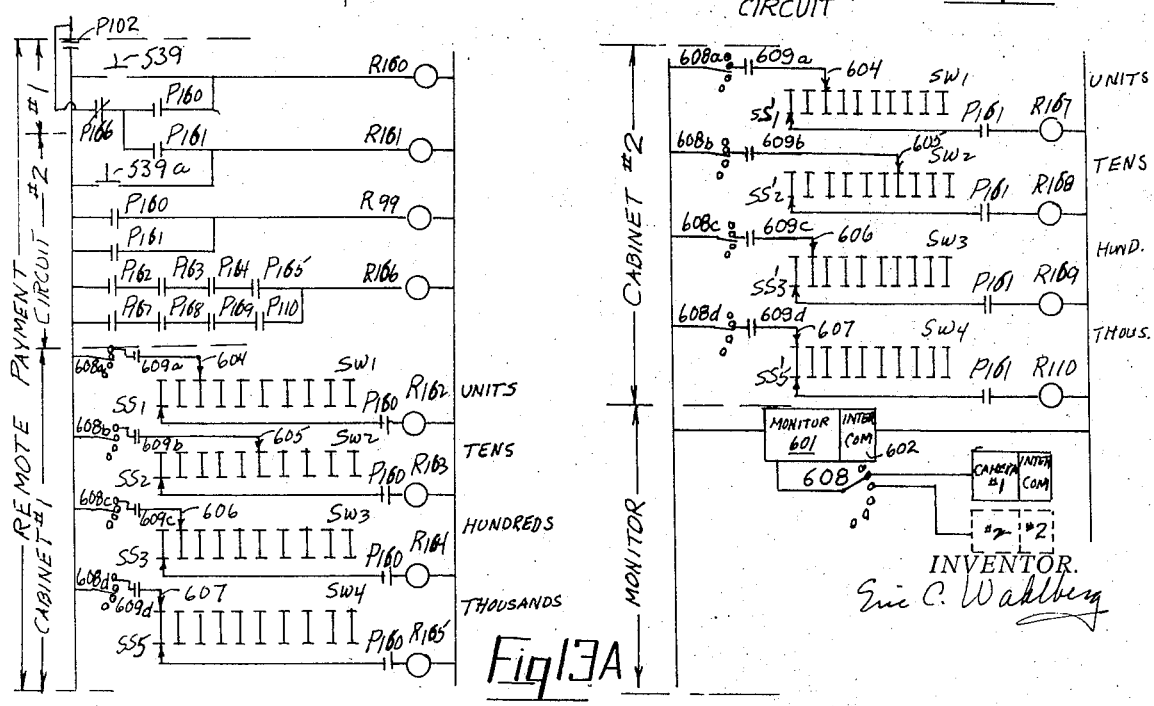
Figure 13:
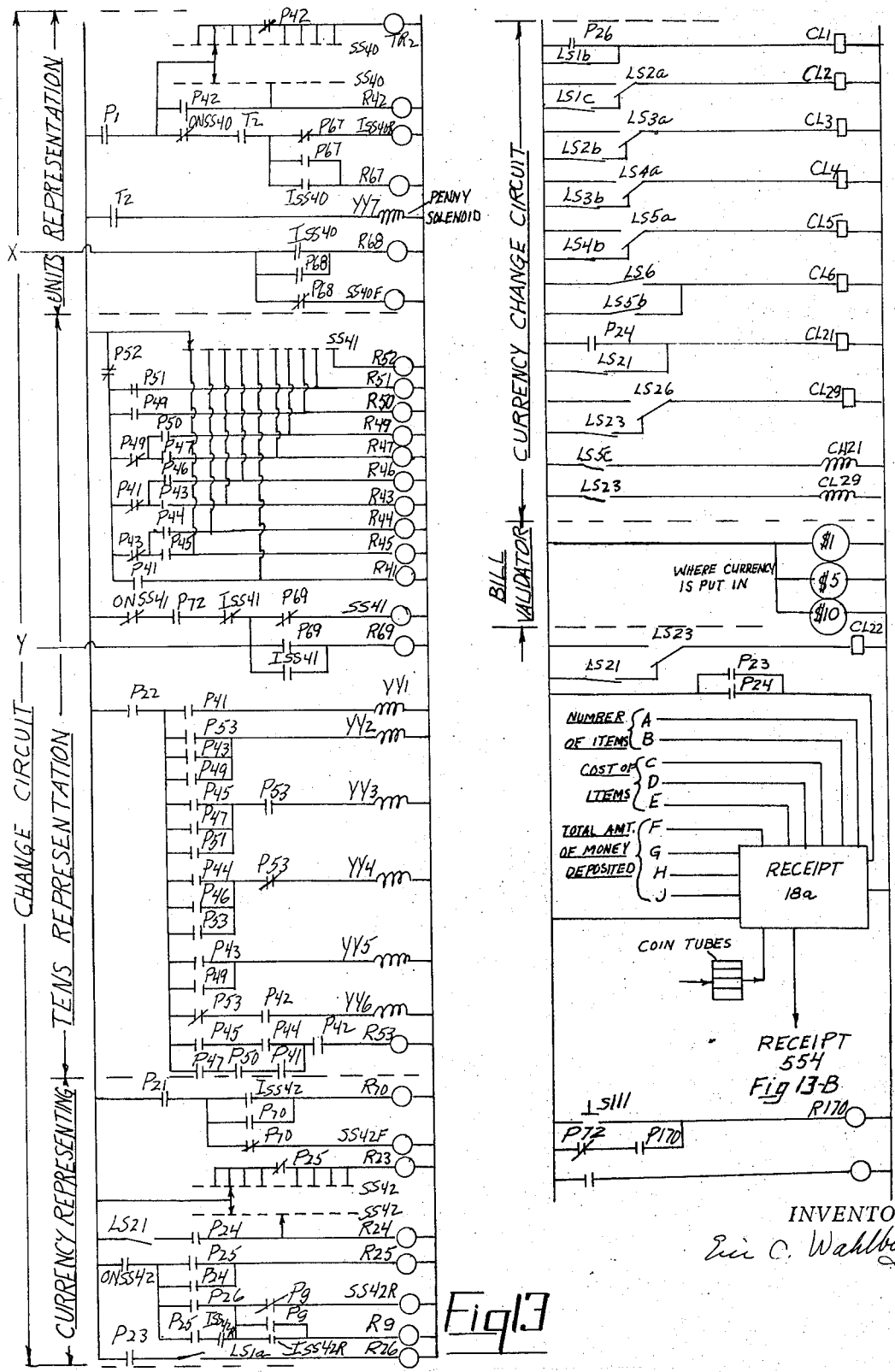

The currency input of FIG. 10 is comprised of a coin insertion circuit indicated by circuitry of limit switches LS7-LS11 of FIG. 11, and a paper currency insertion circuit as indicated by the bill validator of FIG. 13 and limit switches LS12-LS14 of FIG. 11.

The output of the coin insertion circuit and the paper currency insertion circuit of FIG. 10 is connected to a currency value and pulse generator circuit as indicated by the money pulsating circuit of FIG. 11. The output of this circuit is connected to a value representation circuit as indicated in the match circuit of FIG. 11.

The matching circuit of FIG. 10 has an output connected to the change initiation circuit and another output connected to the item release circuit as indicated in FIGS. 12 and 13.

The change circuit of FIG. 10 is comprised of a change initiator circuit being responsive to the matching output of the matching circuit, and is further comprised of a pulse generator to change circuit connected to the output of the change initiator circuit. The change circuit is further comprised of the circuitry as represented by circuitry for change in units, tens and hundreds as shown in FIGS. 7, 9, 10, 12 and 13, all connected to a coin and bill receptacle 17 which has a photo-electric cell having an output connected to receipt receptacle 18 of the receipt or data storage of FIG. 10 and as indicated in FIGS. 10, 11, 12 and 13.

The items release circuit of FIG. 10 is comprised of the item issue circuit as represented by dispensing circuit of FIG. 12. The item issue circuit is connected to reset switch S11 of the dispensing circuit of FIG. 12. One of the outputs of the item issue circuit is connected to item 1 as represented by limit switches LS45a-LS45j and the other output of the item issue circuit is connected to item 2 as represented by limit switches LS46a-LS46j, as shown in FIG. 12. The output release of the purchased items of the two above items is received in an article tray 12 on the front of the machine. Other items of the release circuit may be dispensed, after a purchase, in a similar manner.

The receipt device as represented by issue receipt device 18 of FIG. 10 may be of conventional design and interconnected to be responsive to the inputs thereto by the currency value representation circuit, the item issue circuit, and the response of the photo-electric cell 17a of the coin and bill receptacle 17. The response of the photo-electric cell 17a to the receipt device 18 prints in a conventional manner on the customer receipt the word "change" or other information notifying the customer of any change that may be due him after a purchase of items from the vending machine.

It should be noted that for clarity of operation, similar components in similar banks of circuits have the same numerals with different letter designations.

Bill validators and acceptors 20 and 20a are conventional and may be of any desired commercial type as manufactured by Coin Acceptors, Inc St. Louis, Mo.; Micromagnetics Industries, Palo Alto,Calif.

Coin acceptor 25 is conventional and may be of any desired type as manufactured by National Rejectors, St. Louis, Mo. and others.

Remote credit circuit of FIG. 10 consists of FIGS. 13A and 13B.

The credit representation as indicated by credit card circuit of FIG. 10 is comprised of credit card circuit and print circuits of FIG. 13B.

The negotiable instrument representation as indicated by check circuit of FIG. 10 is comprised of tender circuit and print circuit of FIG. 13B, cabinet 1 No. and 2 No. circuits and monitoring circuits of FIG. 13A.

Referring to FIG. 14, a side sectional fragmented view of cabinet 580 containing therein credit card 587 located in credit representation slot 582 in holder 535 mounted on cabinet slope is shown. A slot 538 in the cabinet slope is provided for the purpose of the credit representation holders signature which may be applied to tape which is passed from tape roll 530 over roller 531, tape guide 551, under slot 538, over credit card impression head 547 and print mechanism 554 to take up roll 533 driven by motor M10. Just after the tape has passed over print mechanism 554, the tape is separated to allow one ply to pass through slot 589 to be used as a credit representation receipt 550. The credit representation impression head is located in a housing 650 and controlled by solenoid 545 which is responsive circuitry of FIGS. 11, 12, 13 and 13A and actuated through linkages 548 mounted through cushion 546 to housing 650. When solenoid 545 is energized in response to the above mentioned circuits, linkages 548 are straightened to provide a predetermined pressure between case bottom 650 and credit representation means 587 to leave a printed impression on the multi-ply tape from roller 530. Tape advance is provided by motor M10 in response to print head 554 as well known in the art. Any of the commercial print heads having print wheels which will respond to electrical signals from the circuitry referred to may be used to print the information in response to the electrical circuitry of FIGS. 11, 12, 13 and 13A, and is designated as 554 in FIG. 14.

FIG. 15 is a fragmented sectional view of the negotiable instrument and legal tender handling mechanism along lines 15—15 in FIG. 1. FIG. 16 is a sectional view of the negotiable instrument and legal tender handling mechanism taken along lines 16—16 of FIG. 15. A slot 556 is located in sloping surface 560 of cabinet 580. Cooperating with this slot is a pair of belts 557 cooperatively driven by motor M11 in response to circuitry of FIG. 13. A photo-cell 558 is located a distance below the slope 560 and in optical relation with openings 651 in the belts 557. The distance below the shelf 560 is determined by the gripping of legal tender by the belts 557. Slots 651 are provided for actuation of the photo-electric circuit and the responsive action of the motor M11 to the photo-electric circuit. In lieu of a single pair of belts as outlined above, two pairs of belts spaced so that an optical path is always present may be used with the same photo-electric circuitry. Other means for gripping such things as paper are well known in the art and therefore those skilled in the art can devise many ways to accomplish the same results as provided in the described embodiment. Belt rollers 559, photo-cell 558, motor M11 are mounted to support 563 which in turn is mounted to the cabinet 580 by support 564. A hopper 562 is removably mounted to support 563. Legal tender and negotiable instruments are deposited into hopper 562 in response to circuitry of FIGS. 13 and 13A.

Referring to FIG. 17, any number of vending units 10 each of which could be capable of handlin a normal number of many different articles and responsive to insertion of credit representations, negotiable instruments, legal tender or other vouchers can be assembled into an area for complete automation of an entire merchandising enterprise such as those called supermarkets, drug stores, etc. An aisle 665 would be provided between two sets of vending units facing each other. A service aisle 663 accessible from the storage area only would be provided between the rear faces of the pairs of vending machines. Servicing of the machines would be through access doors 661 and 662 which faces aisles 663. The machines are interconnected with remote station 600 by means of conduit 660. The front of the service aisle 663 is closed by panel 666 while the rear of the vending aisle 665 is closed off by 664. Monitor 601 on remote station 600 is switchably connected to a camera located in each of the vending units and optically in line with reflector 536 and sloping shelf 560 of cabinets 580. Associated with each of the video circuits is an inter-com system also switchably connected to the remote station inter-com 602. Each unit has a display case 10a, a selection and coin and bill insertion panel, a receipt and change receptacle, credit representation acceptance mechanism and receipt issuing mechanism together with negotiable instrument, legal tender and other voucher acceptance means which, when monitored by remote station 600, is responsive to the actuation of the controls at the monitoring station 600. Each vending unit has an article receptacle from which purchased articles may be claimed.

Each individual vending machine can also have its local monitoring unit for the same operations as described above. This unit would require a special key for operation only by designated personnel.

Operation of the Machine

In the embodiment used to describe this invention, the value of legal tender, credit representation, negotiable instrument or other voucher is inserted into the apparatus. The items or services desired are inserted into the apparatus and, as a result of proper insertion of these requirements, the items or services are issued together with any change that may be due because of over insertion of payment values.

When payment is made by the customer by insertion directly into the machine of coins and paper money, pennies step stepping switch SS1 directly through LS7, P31, and P54. Nickels step SS1 five times by means of limit switch LS8 through SS31. Dimes step switch SS2 through limit switch LS9. Quarters step switches SS1 and SS2 through limit switch LS10, stepping switches SS30 and SS31. Switch SS2 is stepped twice and SS1 is stepped five times for each 25 cents coin. Half dollars step switch SS32 through limit switch LS11, relay R29 and switch SS30 five times. A one dollar bill steps switch SS3 once through limit switch LS12. A five dollar bill steps SS3 through limit switch LS13, relay R6, and switch SS4 five times. A ten dollar bill steps switch SS5 once through limit switch LS14. Thus a predetermined amount of money may be inserted to cover the cost of several items to be purchased, which may vary in price if it is so desired.

A purchased item is selected by pushing switches S1, and S2. This brings either relay R16 or R17 into the circuit and determines the cost position of the stepping switches SS10, SS11 and SS12. These stepping switches are then stepped through off neutral contacts ONSS10, ONSS11, and ONSS12 and contacts P33, P34, P1, P2, P5, P10, P11, P12 until P16 contact is reached on corresponding banks of switches SS10, SS11, and SS12 at which time contacts P10, P11 and P12 open and the stepping of switches SS10, SS11 and SS12 is stopped. The stepping switches SS10, SS11 and SS12 causes corresponding switches SS20, SS21 and SS22 to step an equivalent number of steps. Thus, the cost of the first item purchased is set into the computor circuit. Other articles may be added to this cost by pushing the appropriate switch similar to switch S1. Thus, a total cost has been inserted in the computor circuit of the machine.

When each item of cost has been inserted in the computor circuit as evidenced by relays R10, R11 and R12 being energized, switch SS45 is stepped once through contacts P18, P16 and P65. As a result of the above circuit operation, the selected item of goods is released through stepping switch SS45 bank, LS 45a and causes solenoid X10 operation of the item shelf 23 of FIG. 3. Similarly, other items are released through their appropriate circuits and solenoids.

If the costs as represented by switches SS20, SS21 and SS22 are less than the money inserted as represented by stepping switches SS1, SS2, SS3 and SS5, then switches SS20, SS21 and SS22 are stepped by contact P20 when switch S10 is closed to request the vending machine to return the change. As a result of the stepping of switches SS20, SS21 and SS22, circuits are established through appropriate banks of stepping switches SS40, SS41 and SS42 to give correct change. Stepping switch SS20 steps switch SS40, and switch SS21 steps stepping switch SS41 and switch SS22 steps switch SS42.

Stepping switches SS20, SS21 and SS22 are stepped until relays R1, R2, R5 and r59 are energized through corresponding banks of stepping switches SS1, SS2, SS3 and SS5. The number of units change is now registered on switch SS40. The number of tens change are now registered on switch SS41. The number hundreds (dollar bills) are registered on switch SS42. By following the circuits of the energized relays R41 and R42, the correct number of nickels, dimes, quarters and halves will be issued when contact P22 is closed. Pennies are issued by the circuit of stepping switch SS40 banks and if the number is greater than five, the number above five will be issued and the equivalent of a nickel registered in relay network of switch SS41. If there are less than five, that number will be issued with no nickel transfer.

Similarly the number of dollars will be issued for the position of SS42. If the value is greater than five, that number of singles above five will be issued plus a five dollar bill.

If the value is less than five, then only that number of singles will be issued. The issuring will commence when contact P21 is closed, as determined by the requirement of stepping switches SS3 and SS22.

Should a customer desire to use a credit representation such as a credit card instead of cash to satisfy the cost of the articles to be purchased, she would insert the credit card in the slot 582 of FIG. 14. The push button 540 FIG. 1 and 13 is depressed to signal the remote station 600 FIG. 17. The operator would be signalled by light 603 that a credit representation is offered to satisfy the required payment. The operator at station 600 turns a multiposition switch 608 FIG. 17 and 13A to connect the machine 10 into the closed circuit television and intercom circuits as well as the circuits to the computor. The person as well as his credit card appears on the screen 601 by means of camera 537 FIG. 2a and reflector 536. The customer may then be asked to supply identification which is placed just below the credit card and appears on he remote screen 601. If the identification appears satisfactory and the card acceptable, the customer is then asked to sign her name and write whatever is necessary to identify the identification in the slot 538. By means of the screen 601, the signature may be verified with the identification medium. The operator, by now, has determined the validity of the customer and the card. If he disapproves, he asks the customer to remove the card and pay for any purchases in cash. If he approves, he pushes the button 610 FIG. 17 and 13 on remote station 600. He also inserts into the circuitry the agreed amount of credit by turning dials 604, 605, 606 and 607 to reflect the amount of credit. By pushing button 609 Switches SS1, SS2, SS3 and SS5 are caused to step until they match the settings of corresponding switches SW1, SW2, SW3 and SW4 which were set by dials 604, 605, 606 and 607. Meanwhile, the operator has pushed the button 610 FIG. 17 and 13 on remote station 600. This energizes solenoid 545 of FIG. 14 which causes credit card to impart its information onto the tape 530 which has already been signed. When the totals of the purchase have been calculated by the computor, the printing mechanism 554 which has been monitored by the computor to reflect the continuous summing of costs, prints the total on the tape 530. The tape is then advanced by motor M10 with one laminate 550 being issued through slot 589 as a receipt and the other laminates being wound on roller 533 to be used for billing an office records. Any of the various printing assemblies which accept data may be used in conjunction with the computor circuitry. Such units may include those provided by Pressin Co. in their model MD5R. The machine is cleared without insertion of currency by the completion of the printing.

Should a customer desire to pay by negotiable instruments such instrument would be placed on the shelf 560 FIG. 16 and button 539 pushed to indicate to the remote station by means of light 603a that a customer has an instrument other than that described above which is to be used as payment for goods. As for the credit representation above, the operator goes through the procedure for connecting the machine into the circuit of the remote station. The customer and the instrument appears on the screen 601 and the operator notes the type and value represented by the instrument. An idenfication may then be asked for which is placed alongside the instrument. The operator compares and examines both. The customer would then be asked to sign in slot 538 and enter instrument information which is checked by the operator. If the operator grants approval, the customer inserts the instrument into slot 556 FIG. 1 and 16. The operator then pushes button 609 which energizes motor M11 FIG. 13 and 15 to cause belts 557 to pull instrument into the machine and place it in the hopper 562. While this takes place, the operator has set dials 604, 605, 606 and 607 to reflect the amount of the value represented by the instrument. Should the instrument be a foreign currency, the exchange rate would be taken into account in establishing its value. Pushing of bottom 609 also causes SS1, SS2, SS3 and SS5 to step to match the settings of corresponding switches SW1, SW2, SW3 and SW4 which were positioned by dials 604, 605, 606, and 607. If the cost of items purchased as represented by SS1, SS2, SS3 and SS5 is less than the value determined by the setting of the dials 604, 605, 606 and 607, then SS1, SS2, SS3 and SS5 will be stepped by means of contacts P99 until corresponding relays R162, R163, R164 and R165 are energized. Change for the difference has been determined as has been described above for coin and bill insertion. The totals of the transaction are printed on the tape 530 by print mechanism 554 as described under credit representation discussion.

The legal tender of a large denomination is handled in the same manner as described in the preceding paragraph for the handling of negotiable instruments. The legal tender may be that of any principality or country which is acceptable to the taker who will determine its value taking into consideration the rate of exchange. Thus, the machine may be used in any country using that country's currency especially when the above described acceptance procedure is adhered to. The value of the currency will be translated into values, by turning of the dials 604, 605, 606 and 607, in accordance with determined translations of monetary ratios, which are usable in the machine.

The dials 604, 605, 606 and 607 of remote station 600 may be placed below the push buttons 539 and 540 on the sloping shelf of cabinet 580 of FIG. 1. A key lock would be provided on cabinet 580 for the purpose of local operation, by an attendent, of the credit and negotiable instrument operation described above. The attendent would insert key into key switch and then procede as described for remote operation herein before. Should a treated or punched credit card be used, any of the checking devices on the market could be used to check the card and determine its validity and thereafter allow the holder to determine and enter the desired amount of credit, up to the limit of the credit limit of the card, into the computor by the use of the local dials 604, 605, 606 and 607 which have been automatically switched into the circuitry by the card. Such peripheral equipment and its connections into the subject machine can easily be adapted to transfer the information, e.g., maximum credit limit imposed on the treated or punched card to the circuitry of this machine. Such information could trigger a relay to connect the setting of the match relays R1, R2, R5 and R59 to the maximum amount represented on the card. The contacts involved would connect the contacts associated with the values of the card to the above mentioned match relays. This would still allow the customer to set in the amount desired in the payout provided it was less than the maximum of the card. It would also allow him to receive change from any purchase. This is accomplished according to procedures outlined above and hereinafter.

Dollar Changer

LS1, LS2, LS3, LS4, LS5 and LS6 are limit switches which control the corresponding clutches for moving the conveyors of FIGS. 6 and 7 cooperating with bill validator 20.

If stepping switch SS42 has been stepped sufficiently forward the number of dollars as represented by pulses generated when SS22 was stepped to match SS3 to balance cost and money received, then the actual dollar difference is represented on stepping switch SS42. Contact P21 closes as a result of dollar stepping switches for cost SS22 and money inserted stepper SS3 having been matched. This causes relay R23 to energize through SS42 bank and P21 and close the circuit to relay R26 if there is a bill in the conveyor C1 as evidenced by LS1a being closed. This causes switch SS42 to step bak once. When a dollar bill on conveyor C1 has passed out of the conveyor and another has entered, the above circuit is ready to deliver the second bill in the same manner. This continues until either the sixth contact representing 5 dollars is reached or the first contact is reached. Limit switch LS1a indicates by its closed position that there is a bill in the conveyor C1. Likewise, limit switch LS1b indicates that there is a bill in the conveyor C1 when it is open. Closing of contact P23 and limit switch LS1a energizes relay R26 which closes contact P26 and energizes clutch CL1 to move a bill out into receptacle 17. When the bill is out of the conveyor C1, limit switch LS1a will open causing relay R26 to deenergize and to open circuit to conveyor C1, but limit switch LS1b closes to keep conveyor CL1 energized and C1 running. Conveyor C1 will continue to operate until limit switch LS1b opens. LS1b opens when bill from conveyor C2 has gone to a predetermined point in conveyor C1. A bill will be fed from conveyor C2 only if limit switch LS1c is closed indicating that there is no bill in conveyor C1. Since conveyor C2 will have no bill after transfer to conveyor C1, limit switch LS2b is closed and, if conveyor C3 has a bill, its clutch CL3 will be energized to feed a bill into conveyor C2. This continues until the bill has left conveyor C3. Additional bills are passed out by the backward stepping of switch SS42 as it is sequenced by limit switch LS1a and contact P26. If stepping switch SS42 should pass contact six of switch SS42 then relay R24 would be energized, and the dollar bill circuit would be opened by contact P24. Then the stepping switch SS42 would be stepped to zero contact without operating the dollar conveyors C1-C5. But, as with the dollar conveyors C1-C7, and relay R26, relay R24, relay R24 would cause conveyor C1a to convey a bill to the receptacle 17. Also, the empty conveyor C1A would be filled with another bill from a similar conveyor C2A ahead of it in the same manner as described above.

If a one dollar bill is inserted in the discriminator, and if it is passed, it will actuate limit switch LS6 to energize conveyor clutch CL6. This causes output conveyor C6 to run. When the bill has passed by limit switch LS6, conveyor C6 will stop. If conveyors C1, C2, C3, C4 and C5 are full and there is a bill in the output end of conveyor C7, this last bill will be deposited in the bill hopper 32 as the conveyors C6 receives the bill from the disdriminator 20. If conveyors C1-C5 are not filled, the bill will be fed into conveyor C5. The same procedure is followed for the 5 dollars circuit C21a. Thus, change can be made for any amount up to (9.99 dollars) difference in cost and inserted money or remotely positioned money value. The 10 dollars discriminator is not shown in FIGS. 1-9, but is shown in circuit diagrams, FIG. 13. It is desireable to have one in order that 5 dollars circuit is may be used. To avoid the 10 dollars and higher validators, the tender circuitry and procedure may be used in conjunction with 5 dollars, 10 dollars (not shown) change circuits.

Operation of Circuits

Stepping switch SS1 is stepped once for each penny inserted. Pennies operate limit switch LS7 to step switch SS1 once through contacts P31 and P54. Also, switch SS1 is stepped five times for each nickel and 25 cents coin inserted. Nickels operate limit switch LS8 to pulse switch SS1 through pulses generated by SS31 and contacts P30 and P54. A 25 cents coin operates limit switch LS10 to pulse stepping switch SS31 through contacts P54 and ISS31 which in turn pulses switch SS1 through switch SS31, and contacts P54 and P30.

Stepping switch SS2 is pulsed once for each dime. Dimes operate limit switch LS9 to pulse SS2 once through contact P55. Also, SS2 pulses twice for each 25 cents coin inserted in the vending machine. A 25 cents coin operates limit switch LS10 to pulse SS2 twice through SS30 by means of contacts P28 and ISS30, P28, SS30, relay R27 and contacts P27 and P55. Stepping switch SS2 is stepped five times through SS30 similarly to the 25 cents coin described above. Limit switch LS 11 energizes relay R29 which causes SS30 to stop pulsing. Pulses are generated on an SS30 bank by means of contacts P27 and P55.

Stepping switch SS3 is stepped once for each dollar. Dollar bills operate limit switch LS12 which pulse SS3 once through contacts P31 and P56. A 5 dollars bill pulses SS3 five times. A 5 dollars bill operates limit switch LS 13 to energize relay R6. Contact P6 pulses SS4, which, through its banks and contact P6 and P8 steps, through pulse generated by contact P8, stepping switch SS3 through contact P56 five times.

When stepping switch SS1 reaches the tenth or zero position, relay R3 is energized and pulses stepping switch SS2 once through contacts P3 and P55.

When stepping switch SS2 reaches the tenth or zero postion, relay R4 is energized and pulses stepping switch SS3 once through contacts P4 and P56.

When stepping switch SS3 reaches the tenth or zero position, realy R58 is energized and pulses stepping switch SS5 once through contacts P58 and P57.

Stepping switch SS5 is pulsed once for each 10 dollars bill. A 10 dollars bill operates limit switch LS14 and pulses stepping switch SS5 through contact P57. Coin solenoid 36a operates when coin limit switch LS23 is actuated. As each coin enters the coin chute 26, limit switch LS23 is actuated. This causes coin solenoid to operate to allow no other coin to enter until it is counted into the computing circuit. A timer Tr3 is operated by limit switch LS23 to give sufficient time for a coin to be counted. In the circuit, limit switch LS23 closes to energize relay R71 which in turn locks itself in through contact T3, and contact P71. Relay R71 also closes circuit to timer Tr3 through contact P71. Timer Tr3 is locked in through T3 contact which also causes solenoid 36a to be held in circuit a preset time measured by suitable cam rotation (not shown) or time elapse of magnetic decay circuits as understood by those skilled in the art. In other words, timer Tr3 is for unique smoothing operation of different contact responses to relays to prevent false counting in the circuit networks.

Stepping switches SS10, SS11 and SS12 are costs representing stepping switches. One bank of each is used as a pulse generator. A second bank of each switch is used to represent cost of articles. Cost representation is accomplished by connection by circuit through corresponding bank contacts represented by P16 and P17 or similar contacts. When item button S1 is closed, relay R16 will be energized. This closes P16 contacts as representing the cost bank contacts which also includes circuits to corresponding stepping switches SS10 SS11, and SS12. This causes these switches to step until the corresponding P16 contact on the corresponding cost bank is reached. When this occurs, corresponding relays R10, R11 and R12 are energized. This indicates that the cost of the articles chosen has been counted and pulsed into corresponding stepping switches SS20, SS21 and S SS22 through corresponding bank of stepping switches SS10, SS11, and SS12. When relays R10, R11 and R12 are energized, the pulsing bank of contacts of SS10, SS11 and SSR12 are opened. Thus, stepping switches SS20, SS21 and SS22 are stopped.

Stepping switches SS10, SS11 and SS12 continue to step until the off neutral or home positions are reached. The item circuit is then reset, and another item may now be chosen provided relays R1, R2, R5 and R59 have not been energized. The same procedure as above is followed for succeeding items of purchase.

When the cost of the first item is completely in the computor circuit and the currency steppers have indicated a deposit equal to or greater than the cost, one of the items is released by the stepper as for example, switch SS45 by having stepped once through contacts P18, P16, P65 and switch SS45. Similarly, an item chosen as represented by selector means S2, would similarly be released by switch SS46 through contacts P18, P17, P66 and switch SS46. The contacts of SS45 bank are connected through limit switches to shelf release solenoids as shown in FIGS. 3 and 5. As the contact ar moved along the contact bank, solenoids are sequentially energized to release the corresponding shelf and allow the item on the shelf to be deposited in the receptacle 12 in the front of the enclosure.

When the relays R10, R11 and R12 are energized, relay R18 is energized through contacts P10, P11 and P12. This causes stepping switches SS1, SS11 and SS2 to step to off positions through contacts P18, P12, P11, interupter switches ISS10, LSS11, and ISS12, off neutral switches ONSS10, ONSS11 and ONSS12, and contacts P13, P14 and P15 respectively.

Stepping switches SS20, SS21 and SS22 are summation switches which receive their pulses from corresponding item cost stepping switches SS10, SS11 and SS12. One bank of each stepping switch SS20, SS21 and SS22 are used to hold corresponding stepping switches SS10, SS11 and SS12 until next higher cost stepping switch has completed its cost insertion. This is done on the 9th contact of the bank. The second bank of the stepping switches SS20, SS21 and SS22 is used to transfer to the next higher stepping switch. The t third bank of stepping switches SS20, SS21 and SS22 is used to match the respective currency stepping switches SS1, SS2, SS3 and SS5. A fourth bank of contacts of these switches is used for pulse generation.

When the third bank of stepping switches SS1, SS2, SS3 and SS5 and SS20, SS21, SS22 and SS6, match, then relays R1, R2, R5 and R59 are energized and no further stepping of stepping switches SS20, SS21, SS22 and SS6 occurs. However, if the third banks have not arrived at match position, then there is still currency available in the machine and the customer may have an additional item dispensed to him or have the change returned to him. The change may be obtained by pushing switch S10 which energizes relay R20 if no item is in the process of being registered. Stepping switches SS20, SS21, SS22 and SS6 are stepped through contact P20. However, switch SS21 does not step until switch has reached match point as evidenced by relay R1 being energized and closing contact P1 in switch SS21 circuit. Similarly, stepping switch SS22 does not step until switch SS21 has reached its match point. While SS20, SS21 SS22 and SS6 are stepping as a result of S10 operated, pulses are generated on the fourth bank of stepping switches SS20, SS21 and SS6 as a result of contact P20 closing. Stepping switch SS20 pulses are used to step bidirectional stepping switch SS40. When relay R1 is energized as mentioned above, stepping of stepping switch SS40 forward ceases. Since contact P1 in stepping switch SS40 reverse circuit is closed, stepping switch SS40 will step backwards as monitored by timer Tr2. If the spring wiping arm of stepping switch SS40 is beyond the sixth contact, pennies will be released from the penny tube in the amount indicated by the number of contacts beyond the sixth. When the sixth contact is reached, relay R42 is energized causing itself to lock into the circuit through contacts P42 and P1. Also the penny release circuit is opened by contact P42 so that further backward stepping does not release further pennies. However, if the contact arm does not reach the sixth position, when backward stepping is begun, then penny release would occur as above. Energizing of relay R42 also closes contact P42 in relay R53 circuit and the 5 cents release circuit.

Pulses generated by the fourth bank of contacts of stepping switch SS21 are used to step stepping switch SS41. Each contact of SS41 is connected to a relay. As wiping contact arm of switch SS41 sequentially makes contact with the contacts of stepping switch SS41, the corresponding relay is energized and locks itself in, and in some cases drops out the previously energized relays. In the coin release circuit, the contacts of the relays mentioned above determine the type and number of coins to be issued. As an example, the steppin switch contact arm is shown in the circuit positioned on the fourth contact, which means that thirty cents will be required to make change. This indicates that relay R43 should be energized and locked in. In doing so, however, the previously energized relays R44 and R45 are deenergized. In the coin release circuit, relay R43 is energized to close contact R43 in the 25 cents coin circuit and contact P43 in the nickel circuit. Thus, when contact P22 is closed, which occurs when contact P2 of the match relay is closed, one quarter and one nickel will be released in response to the position of the contact of stepping switch SS41.

Pulses generated by the fourth bank of contacts of stepping switch SS22 are used to step switch SS42 forward. This continues until match contacts of SS22 are reached at which time contact P5 opens and switch SS22 stops stepping. At this time the relay R21 is energized and shifts the circuit from forward stepping to reverse. If contact arm of switch SS42 is positioned beyond the sixth contact then relay R23 will be pulsed once for each contact beyond the sixth contact. When the contact arm reaches the sixth contact, relay R24 is energized and locked in through limit switch LS21, and contact P25 will then step switch SS42 backward to off neutral without further pulsing of relay R23 since contact P25 is open in relay R23 circuit. However, if the contact arm had not reached the sixth contact in its forward motion, then relay R23 would be pulsing as the stepping switch moves backwards to the neutral position. When the contact arm of switch SS42 is energizing relay R23, and if there is a dollar bill in conveyor C1, relay R26 will be energized. This energizes clutch CL1 and starts conveyor C1 to dispense the dollar bill.

Meanwhile, stepping switch SS42 has stepped back one step, when the bill is out of the conveyor as indicated by LS1a being open, then relay R26 is deenergized. This mode of operation of the circuit continues as long as there are bills in conveyors C1-C6 or until SS42 has reached off neutral.

When conveyor C1 is empty, limit switch (photoelectric cell) LS1a is closed and conveyor C1 continues to run. Also, conveyor C2 continues to run because limit switch LS1b is closed and the position of limit switch LS2a indicates a bill in conveyor C2. Thus, the bill in conveyor C2 will be fed into conveyor C1 until LS1a opens and stops conveyor C1. Conveyor C2 will continue to run because limit switch LS3a has shifted to continue to energize conveyor C2. The above conveyors are energized to feed bills to the conveyors ahead of them until all the conveyors are filled as indicated by open circuits to their respective clutches. As many of these conveyors may be placed in series as is practical for making change in dollar bills.

In a similar manner, when the contact arm of switch SS42 is on the sixth contact, relay R24 is energized and locked in the circuit and in turn energizes relay R25 through contact P24 to step switch SS42 to contact ONSS42. Also, conveyor clutch CL21 is energized to dispense a 5 dollars bill from conveyor C1a, relay R25 is deenergized by contact ONSS42, but the clutch of the second conveyor C2A for 4 percent bills will continue to operate until 5 dollars bill has been positioned on conveyor C1a.

The 5 dollar bill conveyor mechanism of bill validator 20a operate in a manner similar to the 1 dollar identifier 20 above, that is, when the bill comes out of the identifier, it trips limit switch LS26 which causes magnetic clutches to be energized and drive C21A and C7A. This causes the bill to be picked up by conveyor C21A. If the conveyors are full, then a bill from the end of conveyor C7A will be deposited in the hopper 32 by swinging the conveyor C7a about pivot 35ga. A solenoid CH2 may be used to pivot conveyor C7A and limit switch LS23 opens the circuit to the solenoid CH2 to release conveyor C7A to its normal position of feeding conveyor C2A.

A monitor 601 and intercom 602 is switched by means of rotary switch 608 to cameras 537 located in each of the machines. This makes it possible to have a closed circuit TV inspection of all the areas of the apparatus. Further, the rotary switch 608 provides a connection means to the individual monetary value insertion registering switches from the dial switches on the remote station panel 600.

Pushing button 540 on the console of the vending cabinet causes bulb 603 to lighton the remote control station 600, relay R101 to energize and lock itself into the circuit by closing P101 and to lock out tender circuit by opening contact P101 in the 539 push button circuit, FIG. 13B. Pushing of S100 after 540 has been pushed causes relay R100 to energize and lock itself into the circuit. Credit card imprint solenoid 545 is also energized and thus causes the credit card information to be recorded on the receipt tape. Relay R101 and remote light 603 are deenergized. The energizing of R100 also closes contact P100 in the S110 switch circuit. The pushing of switch S110 and P100 closed causes print solenoid coil in the receipt assembly 554 to be energized and print the total cost information on the receipt tape. The motion of the print solenoid towards the extreme print position causes limit switch LS100 to close thus causing motor M10 to run. The rotation of motor M10 causes limit switch LS101 to close, by means of a cam mounted to the shaft, and to keep motor running until the proper predetermined amount of tape has advanced which will give the customer the receipt with the cost information, credit card imprint and validation information and signature on it. The closing of LS100 also causes relay R104 to energize and thereby open circuit to R100 by opening contacts P104. This has now reset the credit representation circuit.

Pushing button 539 on the console of the vending cabinet causes a bulb 603a to light on the remote control station panel 600 and relay R103 to energize, lock itself into the circuitry by closing P103, and lock out credit representation circuit by opening P103 in the 540 push button circuit. Pushing S100 on the remote station 600 after 539 has been pushed, causes R103 and bulb 603a to be energized, relay R102 energized and locked into the circuit through the closing of P102. The print solenoid circuit may be actuated by pressing S110. Since P102 is closed, the solenoid will cause printing of information on costs legal tender or negotiable instrument value on the receipt tape. The action of the print solenoid will close limit switch LS100 and energize tape advance motor M10. The starting of the motor M10 will cause limit switch LS101 to close and keep the motor running as described above for credit representation. The energizing of relay R102 also close P102 in the remote payment circuit allowing the value of the legal tender or negotiable instrument as determined by remote control station operator through closed circuit TV and intercom, to be entered into the computor. The turning of dials 604, 605, 606 and 607 may be done on the remote station to insert the value into the computor. The value will be registered on the contacts of the switches associated with the dials SW1, SW2, SW3 and SW4. Since button 539 has already been pushed, relay R160 has been locked in through P160 and P166. When R102 was energized through pushing of S100, P102 was closed causing relay R99 to energize through P160 and P102. Energizing of relay R99 causes SS1, SS2, SS3 and SS5 to be pulsed to a point coinciding with the contacts on which the arms of switches SW1, SW2, SW3 and SW4 came to rest when the dials were set at the remote station. As each of the stepper switches SS1, SS2, SS3 and SS5 matches the corresponding dial switch SW1, SW2, SW3 and SW4, corresponding relays R102, R103, R104 and R105 are energized. When all these relays are energized, relay R106 is energized causing P106 to open, deenergizing relay R160. Thus, the value of the legal tender or negotiable instrument is represented on the contacts of stepping switches SS1, SS2, SS3 and SS5.

Since the credit representation circuit and legal tender and negotiable instrument circuits ostensibly replace the coin and bill insertion circuit, the operation of the article selection is the same for either circuits and their relationships are the same. In fact, coins and bills can be inserted after the completion of the remote insertions of value with the result that the values will be added to the values in the computor. This total value may be used for purchase of articles.

When the present invention is used for some such application as depositing money into a bank account or for paying an account having an identification card, the cost of articles circuit of FIG. 11 would be augmented, in this instance, by three groups of 10 switches located on the console. Each of the switches of one group would be connected to a different contact of stepping switch bank SS10a. Each of the switches of the second group would be connected to a different contact of stepping switch bank SS11a. Each of the switches of the third group would be connected to a different contact of stepping switch bank SS12a. A deposit push button located on the console would control a multi-pole switch. One pole of this switch would connect the first group of switches to relay R10 through normally open contacts. A second pole would connect the second group to the relay R11 through normally open contacts. A third pole would connect the third group to relay R12. The normally open contacts of the fourth pole would parallel the P16 contacts in the SS10 pulsating circuit of FIG. 12. Likewise, the normally open contacts of the fifth and sixth poles would be paralleled with P16 contacts in the SS11 and SS12 pulsating circuits. The normally open contacts of the seventh pole would be connected across S100 contacts in the 545 circuit for actuation of the solenoid for imparting card information to the tape 534. The normally open contacts of the eighth pole would be placed in series with the normally open contacts of a new relay, the series of contacts would connect the line to the print solenoid of FIG. 13. The new relay would be energized by the closing of the normally open contacts of relays R1, R2, R5, and R59 when these relays are energized as a result of matched circuits of FIG. 11.

Switches connected to the SS10a contacts could be labeled 0-9 corresponding to the contacts. Likewise, switches connected to SS11a contacts and SS12a contacts could be labeled 0-9. In the first group, it would represent units, in the second group, tens and in the third group hundreds or dollars. The value of 6.05 dollars could be entered onto the contacts of SS10a, SS11a, and SS12a by actuating switch 5 in the first group, actuating switch 0 in the second group and switch 6 in the third group. Thus, by the use of the individual switches in each group, it is possible to indicate any value desired on the stepping switches which would be used as the desired amount to be deposited in an account such as a bank account or credit account. By actuating the push button of the multiple contact switch mentioned above, the value of 6,05 dollars is connected into the cost circuit as previously described for item selection cost.

A customer desiring to deposit money into an account would approach the apparatus and indicate his intentions by inserting his identification card into the credit card slot 582 FIG. 14 and inserting the money to be deposited into the validators 20, 20a and coin receptor 14. The value of the money is determined by the computor and indicated on the contacts of SS1, SS2, SS3 and SS5 steppers. The customer then indicates the amount of the deposit desired by actuating the proper switches in the groups of switches on the console. This places the amount on he contact of steppers SS10, SS11 and SS12. The multi-pole switch is then actuated causing the amount indicated on the Steppers SS10, SS12 and SS11 to be transmitted to steppers SS20, SS22 and SS21 respectively. The match relays R1, R2, R5 and R59 would be energized causing the new relay referred to above to be energized. Since the multi-pole switch referred to above has been actuated, the print deposit to be printed on the tape 534 of FIG. 2A. The impression of the identification card has already been made by the actuation of the above mentioned multi-pole switch in the 545 circuit of FIG. 13B. The receipt is issued to the customer with the amount of deposit and identification information printed on it. A duplicate is kept in the machine. All as herein before described.

It should be noted that the unit can be expanded in regard to the amount of money to be handled and that the amount of deposit can be increased to any desired total by expanding the number of steppers and corresponding circuitry.

Should the customer have negotiable instruments such as checks which he wishes to convert into payment into an account, he would present these as previously described. The operator would then procede, as before, to credit the machine with the value amount and then, using the several groups of switches, proceed to insert the amount of payment desired. The remaining procedures would be automatically followed until the transaction is completed by the issuance of the receipt with the deposit information and identification information recorded on it.

Should the customer prefer withdrawal, he would insert his check as requested as outlined above. He would insert his identification card and have it printed on the tape with his signature. When the remote operator is satisfied with the negotiable instrument, he would dial the amount into the computor and push button S100 to enter the amount in he computor. The change switch S10 would then be pushed and the customer would receive his money in the amount represented by the negotiable instrument or withdrawal slip as previously described for change operation.

It is, thus, not necessary for the customer to see any teller and a minimum of personnel would be necessary for servicing the operation of a number of installations grouped under one remote station and service could be extended 24 hours a day. Personnel would not be as susceptible to holdups. Records could be made available immediately of any transactions by tying into central data processing center and thus updating each account immediately.

It is now evident that the negotiable instrument, legal tender and credit representation circuits correspond to and can parrallel the coin and bill value inserting circuits in their operation and that they feed directly into the total money inserted circuit by means of the same circuitry. These negotiable instrument and credit circuits can be effectively applied in the same manner to any form of cost value balancing circuit and especially those described in my copending application Ser. No. 556,816 and No. 563,804 without in any way changing or suspending the original operation or order of insertion of information.

The description of operation of a remote control of a number of machines can be applied to each machine. The circuitry may be placed in each individual machine in the place occupied by reflector 536. Switches 604, 605, 606 and 607 and push button S100 would be located conveniently in the reflector area for the supervisory operation with the S100 being a key operated switch. This would provide the same acceptance in the single unit as is supplied by the remote station. The attendent would be notified by a light on top of the unit that a credit representation, negotiable instrument or legal tender would be offered. the attendent would then go to the unit and go through the same procedure with the customer as described for the remote station. When satisfied he would insert his key into the key switch S100 to accept and make the machine operative under the same conditions as described previously. The same circuitry except for TV would be used and would operate in the same manner.

From the circuitry it is evident that a number of data may be taken and translated into printed or visual records or incorporated into stored data and the like or can accept stored data and the like by appropriately attaching such equipment to the circuits of the drawings as understood by those skilled in the art. Further, interconnection with central computers may be made for the purpose of verifying accounts, updating accounts and verifying credit representation.

From the foregoing, it will be seen that there is herein provided an apparatus for business transactions having circuitry, mechanisms and devices for handling all types of legal tender, negotiable instruments and credit representations including foreign as well as domestic values involved in transacting business such as merchandising, Post Office mail handling, banking, currency exchange, credit extension, payments on account, etc., which accomplishes all the objectives of this invention, and others including many advantages of practical utility and commercial importance. Such advantages include reduction of personnel, customer convenience, flexibility, utmost security which reflect into reduction in costs of operation and increase in good will.

The embodiment described above is a practical and efficient embodiment of the present invention, yet the incorporation of the invention in areas other than mentioned above will provide equally practical and efficient embodiments. It is therefore important that the invention is not limited to the present embodiment since application of the devisings to existing and new machines of various natures may be made without departing from the principles of the present invention. Further, since changes may be made in the arrangement, deposition, form and types of the parts without departing from the principles of the present invention, the invention should not be limited thereto but by the scope, in the broadest sense, of the accompanying claims.

I claim

1. A business transaction apparatus comprising in combination means for receiving data for representing the identity of the subject of the transaction and providing an output representative thereof;

cost means connected with said means for receiving data for totaling the cost of the subject of the transaction;

credit means connected with said cost means and including first means for receiving and totaling money inserted in the apparatus, and second means for receiving credit representing means;

cost satisfying means connected with said first means for comparing the total money inserted in the apparatus with the total cost of the subject of the transaction, and credit validation means connected with said second means; and transaction completion means connected with said cost satisfying means for constraining the business transaction apparatus to complete said transaction when the total money inserted is equal to or greater than the total cost of the subject of the transaction or when the credit representing means is validated.

2. A business transaction apparatus comprising first means for identifying an item and providing an output representative of the identity thereof;

cost representing means;

secon means for determining the cost of said item from said cost representing means in response to the output of said first means and providing and output representative thereof;

credit receiving means including third means for receiving and totaling money inserted into said apparatus, and fourth means for receiving credit representing means including means for generating a signal representative of the validity of said credit representing means and means for generating a signal representative of the value charged against said credit representing means; and matching means responsive to said output of said second means and connected with said credit receiving means for comparing the total money inserted in the apparatus with the total cost of the items identified, and means for receiving said signals representative of the validity of and value charged against said credit representing means including means responsive to said signals whereby said credit receiving means is operative until the value charged against said credit representing means and said cost cause said matching means to indicate they are equal.

3. A business transaction apparatus as recited in claim 2 wherein the apparatus further includes a means for issuing a receipt in response to said matching means.

4. A vending machine comprising in combination item selection means for preselecting one or a plurality of items;

cost means connected with said item selection means for totaling the cost of the items selected;

credit receiving means including first means for receiving and totaling money inserted in the vending machine, and second means for receiving credit representing means including means for generating a signal representative of the validity of said credit representing means and value charged means for generating a signal representing the value charged against said credit representing means;

matching means connected with said cost means and said credit receiving means for comparing the total money inserted in the vending machine with the total cost of the items selected, and means for receiving said signals representative of the validity of the value charged against said credit representing means including means responsive to said signals whereby said credit receiving means is operated until said credit receiving means and said cost means cause said matching means to indicate they are equal; and item issue means connected to and responsive to said matching means for issuing the selected items.

5. The vending machine recited in claim 4 wherein said credit receiving means includes manually controlled lock means for connecting manual means for insertion of cost satisfaction information into said credit receiving means.

6. The vending machine as recited in claim 4 wherein said first means includes means for receiving coins and paper currency.

7. The vending machine as recited in claim 6 and further including change dispensing means connected with said matching means to dispense change in coins and paper currency in accordance with the difference between the total money inserted in the vending machine and the total cost of the items selected.

8. The vending machine as recited in claim 4 wherein said first means includes means for receiving and totaling paper currency including validating means for validating the paper currency, storage means for the paper currency, first conveyor means for delivering paper currency to the storage means and second conveyor means for delivering the paper currency from the storage means to a change receptacle.

9. The vending machine is recited in claim 8 wherein said storage means includes means for selectively storing the paper currency in said storage means or delivering the paper currency to said second conveyor means.

10. The vending machine as recited in claim 9 wherein said storage means includes a hopper, and limit switches are disposed adjacent said second conveyor means to detect the presence or absence of paper currency therein and said selective means is responsive to said limit switches to control the storage of the paper currency or the delivery of the paper currency to aid second conveyor means whereby said second conveyor means is full of paper currency additional paper currency inserted in the vending machine is stored in said hopper.

11. The vending machine is recited in claim 4 wherein said credit receiving means includes third means for receiving a negotiable instrument connected to said matching means and including means for generating signals representative of the validity and value of said negotiable instrument;

said matching means including means for receiving said signals representative of the validity and value of said negotiable instrument including means responsive to said signals whereby said credit receiving means is operated until said credit receiving means and said cost means cause said matching circuit to indicate they are equal.

12. The vending machine as recited in claim 11 wherein said credit receiving means includes fourth means for receiving paper currency, said validation means is connected with said fourth means, and said item issue means issues the selected items when the paper currency is validated and the value of the paper currency is equal to or greater than the cost of the items.

13. The vending machine as recited in claim 12 wherein said first means includes means for receiving coins and paper currency of denominations less than the paper currency received by said fourth means.

14. The vending machine as recited in claim 13 and further including change dispensing means connected with said matching means to dispense change in coins and paper currency of denominations less than the paper currency received by said fourth means in accordance with the difference between to total money inserted in the vending machine and the total cost of the items selected.

15. A business transaction apparatus for depositing values into a bank account, paying loan installments or paying bills comprising in combination first means for receiving an account representation;

validating means connected with said first means for providing a signal representative of the validity of said account representation;

a cost representing means including second means for receiving a cost value upon generation of said signal by said validating means; said second means including means for generating a signal representative of said cost value;

cost satisfying means for receiving a cost satisfaction value including signal generating means for providing a signal representative of the cost satisfaction value for the business transaction;

matching means connected to said cost representing means and said cost satisfying means for comparing the cost value of the cost representing means and the cost satisfaction value of the cost representing means and the cost satisfaction value of the cost satisfying means whereby said cost satisfying means is operated until said cost representing means and said cost satisfying means cause said matching means to indicate said cost satisfaction value and said cost value are equal; and receipt issue means connected with said matching means for issuing a receipt in response to said matching means when said cost satisfaction value is equal to said cost value and responsive to said signal representative of the validity of said account representation.

16. The business transaction apparatus as receited in claim 15 wherein said matching means includes change determination means responsive to the difference between said cost satisfaction value and said cost value and connected to a change issue means which is responsive to said matching means.

17. A business transaction apparatus as recited in claim 15 wherein said cost satisfying means includes means for receiving and generating a signal representing the validity and value of a negotiable instrument, said means being connected to said cost satisfying means.

18. A business transaction apparatus as recited in claim 15 wherein said cost satisfying means includes means for receiving and totaling legal tender connected to said cost satisfying means.

19. A business transaction apparatus as recited in claim 15 wherein said receipt issue means includes data storage means.

20. A remote control transaction system comprising a plurality of transaction stations;

each of said transaction stations including item selection means, cost means connected with said item selection means for totaling the cost of the items selected, credit receiving means including first means for receiving and totaling money inserted in the station and second means for receiving credit representing means including validating means for generating a signal representative of the validity of said credit representing means and a signal representing the value charged against said credit representing means; matching means connected to said cost means and said credit receiving means, for comparing the total money inserted in the station with the cost of the items selected, and means for receiving said signal representative of the validity of and value charged against said credit representing means including means responsive to said signal whereby said credit receiving means is operated until value charged against said credit representing means and said cost means cause said matching means to indicate they are equal, item issue means connected with said matching means and responsive thereto to dispense the selected item after the matching means indicates the cost of the items and the value and value charged inserted into the credit receiving means are equal, and monitoring means for monitoring the receiving of said credit representing means and the generation of signals corresponding thereto;

a remote control station including receiver means for receiving said signals from said monitoring means and said validating means is connected with said receiver means for generating signals indicating authenticity of the value charged against said credit representing means; and means connecting said remote station with said plurality of transaction stations to supply said signals from said monitoring means to said receiver means, and to supply said signals from the validating means to said matching means.

21. The remote control transaction system recited in claim 20 wherein said monitoring means includes a television camera.

22. The remote control transaction system as recited in claim 20 wherein each transaction includes currency dispensing means connected with said matching means for dispensing currency of a first country, said credit receiving means includes means for receiving currency of a second country, said monitoring means includes means for monitoring the currency of the second country and generating a signal corresponding to the value thereof and said validating means includes means for generating signals corresponding to the authenticity of the currency of the second country and value of the currency of the second country expressed in the currency of the first country.

23. The remote control transaction system as recited in claim 22 wherein said matching is connected with said currency dispensing means for comparing the total cost of the items selected and the value of the currency of the second country expressed in the currency of the first country and generates signals received by said currency dispensing means to cause currency of the first country to be dispensed in accordance with the difference between the value of the currency of the second country expressed in the currency of the first country and the total of the items selected.

24. The remote control transaction system as recited in claim 20 wherein said credit representing means includes a negotiable instrument, said validating means includes means for generating signals representing the value of the negotiable instrument, said matching means compares the total cost of the items selected and the value of the negotiable instrument, and said item issue means is connected with said matching means to dispense the selected item if the value of the negotiable instrument is equal to or is greater than the total cost of the items selected.

25. The remote control transaction system as recited in claim 24 wherein change dispensing means is connected with said matching means to dispense change in accordance with the difference between the value of the negotiable instrument and the cost of the items selected.

26. The remote control transaction system as recited in claim 24 wherein said monitoring means includes a microphone.

* * * * *